US007308925B2

(12) United States Patent
Yun

(10) Patent No.: US 7,308,925 B2
(45) Date of Patent: Dec. 18, 2007

(54) APPARATUS FOR ASSEMBLING SUBSTRATES OF PLANAR FLUORESCENT LAMP

(75) Inventor: Jae Doo Yun, Kyunggido (KR)

(73) Assignee: Mirae Corporation, Choongcheongnamdo (KR)

( * ) Notice: Subject to any disclaimer, the term of this patent is extended or adjusted under 35 U.S.C. 154(b) by 332 days.

(21) Appl. No.: 11/028,064

(22) Filed: Jan. 4, 2005

(65) Prior Publication Data

US 2006/0063465 A1 Mar. 23, 2006

(30) Foreign Application Priority Data

Sep. 23, 2004 (KR) ...................... 10-2004-0076400

(51) Int. Cl.
*B32B 37/00* (2006.01)

(52) U.S. Cl. ........................................ 156/580; 445/66

(58) Field of Classification Search ................ 156/580, 156/581, 583.1, 228; 100/315, 259; 445/60, 445/66, 69

See application file for complete search history.

(56) References Cited

U.S. PATENT DOCUMENTS

| | | | | |
|---|---|---|---|---|
| 4,611,455 | A * | 9/1986 | Aiuola et al. | 53/374.9 |
| 4,736,615 | A * | 4/1988 | Smedberg et al. | 72/453.13 |
| 5,176,075 | A * | 1/1993 | Vegue | 100/282 |
| 5,509,841 | A | 4/1996 | Winsor | |
| 5,850,122 | A | 12/1998 | Winsor | |
| 6,245,167 | B1 * | 6/2001 | Stein | 156/64 |
| 6,639,351 | B1 | 10/2003 | Tsai et al. | |
| 2004/0150317 | A1 | 8/2004 | Kim et al. | |
| 2004/0150318 | A1 | 8/2004 | Kim et al. | |

FOREIGN PATENT DOCUMENTS

| | | |
|---|---|---|
| JP | S50-8869 | 5/1973 |
| JP | S50-28753 | 7/1973 |
| JP | 08-287830 | 11/1996 |
| JP | 11-339719 | 12/1999 |
| JP | 11339720 A | 12/1999 |
| JP | 2001-126617 | 5/2001 |
| WO | WO95/22835 | 8/1995 |

* cited by examiner

*Primary Examiner*—James Sells
(74) *Attorney, Agent, or Firm*—Ked & Associates, LLP

(57) ABSTRACT

Apparatus for assembling substrates of a planar fluorescent lamp including a base mounted movable along a process line, the base having an upper surface for placing a first substrate of the fluorescent lamp, at least one movable board over the base, the movable board being mounted rotatable between a first position and a second position, at least one pair of parallel links each having one end rotatably coupled to the base and the other end rotatably coupled to the movable board for the movable board rotatable from the first position to the second position, a plurality of clamping members mounted on the movable board for holding a second substrate of the fluorescent lamp at a position under the movable board, a stopping member mounted in the process line over a direction of movement of the base, for coming into contact with the movable board to cause rotation of the movable board, and a damping member for making a damping action at a time the first, and second substrates of the fluorescent lamp come into contact with each other as the movable board rotates, downwardly.

25 Claims, 12 Drawing Sheets

APPARATUS FOR ASSEMBLING SUBSTRATES OF PLANAR FLUORESCENT LAMP

CROSS-REFERENCE TO RELATED APPLICATIONS

This application claims the benefit of Korean Application No. P2004-76400 filed on Sep. 23, 2004, which is hereby incorporated by reference as if fully set forth herein.

BACKGROUND OF THE INVENTION

1. Field of the Invention

The present invention relates to an apparatus for assembling substrates of a planar fluorescent lamp, and more particularly, to an apparatus for assembling an upper substrate and a lower substrate of a planar fluorescent lamp.

2. Discussion of the Related Art

Recently, as a back light unit which is a back side illumination of an LCD panel, use and development of the planar fluorescent lamp, which can provide a high luminance and a high luminance uniformity, increases, rapidly. The planar fluorescent lamp is fabricated by assembling an upper plate of a serpentine shape and a planar lower plate with sealfrit, and coating fluorescent material on an inside space thereof.

An example of the planar fluorescent lamp will be described, briefly with reference to the attached drawings 1 and 2.

Referring to FIGS. 1 and 2, the fluorescent lamp 100 is provided with an upper substrate 101 and a lower substrate 102, which are separable in up/down directions. The upper substrate 101 has a shape of serpentine, and one pair of electrodes at opposite ends.

The lower substrate 102 is planar. The upper substrate 101 and the lower substrate 102 are assembled in an up/down direction with sealfrit. The assembly of the upper substrate 101 and the lower substrate 102 form a single channel 104 in the fluorescent lamp 100, on which a fluorescent material is coated. The sealfrit and the fluorescent material are set by heating.

The fluorescent lamp 100 is fabricated by evacuating an inside of the fluorescent lamp 100, and attaching the electrodes 103 after finishing setting of the upper substrate 101 and the lower substrate in a furnace at an elevated temperature.

However, the related art planar fluorescent lamp has the following problems in fabrication.

In a related art process for fabricating the fluorescent lamp in the furnace, a baking process is performed to attach the sealfrit and the fluorescent material to surfaces of the upper substrate and the lower substrate, then an assembling process is performed, to bond the upper substrate and the lower substrate together loaded on a separate assembling apparatus, and to pass the upper substrate and the lower substrate through the furnace, to bond the upper substrate and the lower substrate completely, thereby finishing fabrication of the fluorescent lamp.

However, the baking process and the assembling process performed separately with separate apparatuses cause to require the upper substrate and the lower substrate fed into, and drawn out of the furnace frequently, not only to drop working efficiency, with consequential poor productivity, but also to cause cases when the upper substrate and the lower substrate are damaged during working, frequently.

Moreover, since there have been no means for continuous fabrication of a plurality of fluorescent lamps in the related art, excessive working time period is required for mass production of the fluorescent lamps.

SUMMARY OF THE INVENTION

Accordingly, the present invention is directed to an apparatus for assembling an upper substrate and a lower substrate of a planar fluorescent lamp that substantially obviates one or more problems due to limitations and disadvantages of the related art.

An object of the present invention is to provide a an apparatus for assembling an upper substrate and a lower substrate of a planar fluorescent lamp, in which the baking process and the assembly process are performed continuously in a state an upper substrate and a lower substrate of the fluorescent lamp are held together, to minimize supply of the substrates to, and drawing out of the substrates from furnace, and enable mass production of the planar fluorescent lamp.

Another object of the present invention is to provide an apparatus for assembling an upper substrate and a lower substrate of a planar fluorescent lamp, in which, after sealfrit and fluorescent material are baked on surfaces of an upper substrate and a lower substrate, the upper substrate and the lower substrate are assembled without using separate driving means, while preventing the upper substrate and the lower substrate suffer from damage caused by impact during the assembly.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for assembling substrates of a planar fluorescent lamp includes a base mounted movable along a process line, the base having an upper surface for placing a first substrate of the fluorescent lamp, at least one movable board over the base, the movable board being mounted rotatable between a first position and a second position, at least one pair of parallel links each having one end rotatably coupled to the base and the other end rotatably coupled to the movable board for the movable board rotatable from the first position to the second position, a plurality of clamping members mounted on the movable board for holding a second substrate of the fluorescent lamp at a position under the movable board, a stopping member mounted in the process line over a direction of movement of the base, for coming into contact with the movable board to cause rotation of the movable board, and a damping member for making a damping action at a time the first, and second substrates of the fluorescent lamp come into contact with each other as the movable board rotates, downwardly.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
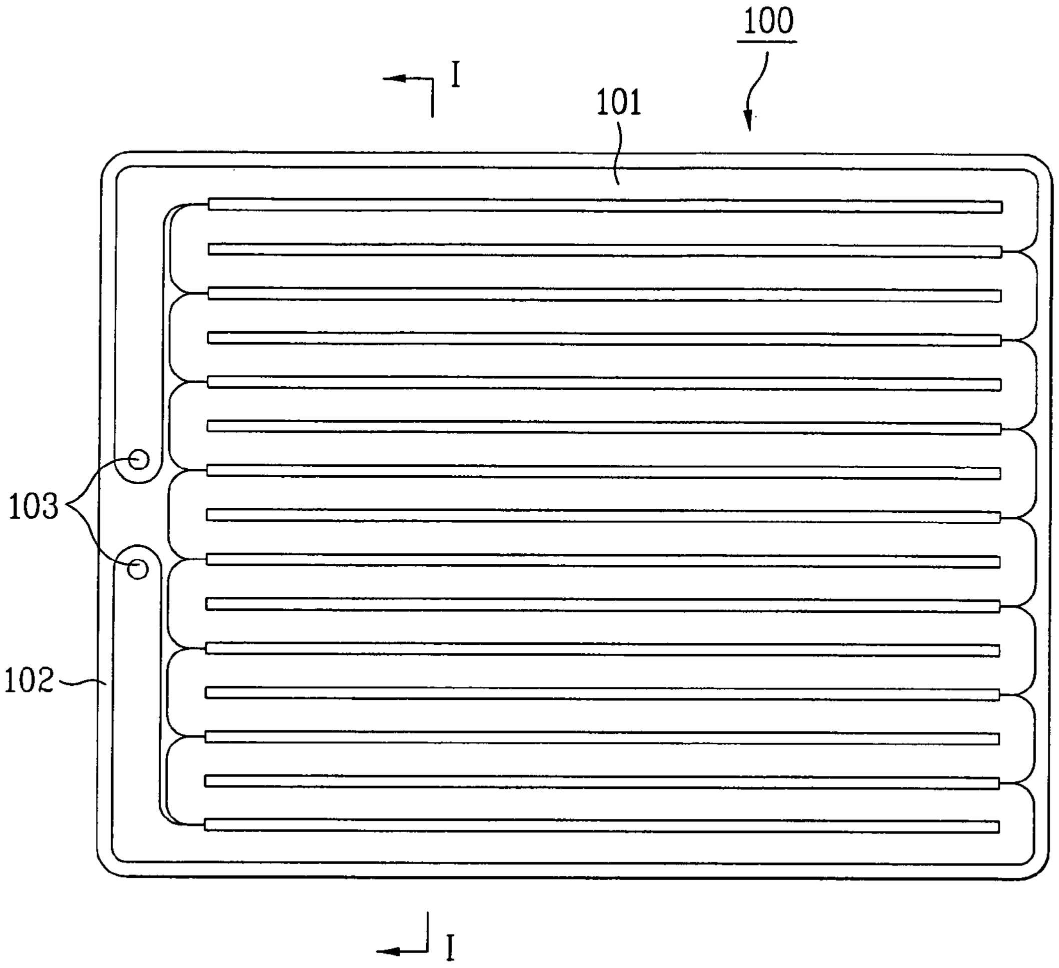
FIG. 1 illustrates a plan view showing an example of related art planar fluorescent lamp.
Figure 2:
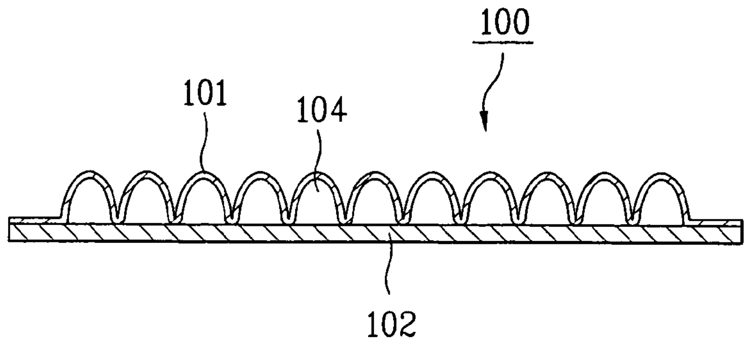
FIG. 2 illustrates a section across a line I-I in FIG. 1.

For convenience of description, with regard to a structure of a planar fluorescent lamp of the present invention, a fluorescent lamp structure shown in FIGS. 1 and 2 will be referred to, and detailed description of which will be omitted.

Figure 3:
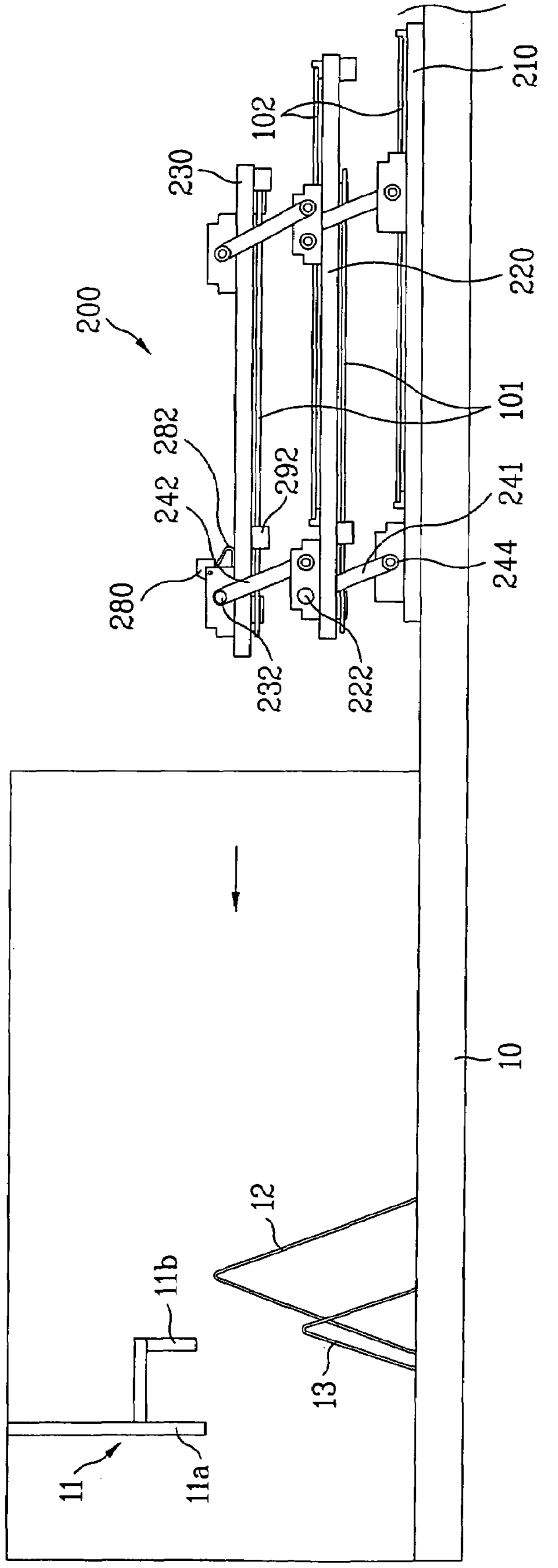
FIG. 3 illustrates a section of key parts of an apparatus for fabricating a fluorescent lamp showing a device for assembling substrates in accordance with a preferred embodiment of the present invention.

Referring to FIG. 3, a substrate assembling apparatus (also called as 'assembly jig) 200 is designed to carry an upper substrate 101 and a lower substrate 102 of the fluorescent lamp while being moved along a process line 10 by a carrier of a furnace which performs baking and assembly, to seal, and bond the upper substrate 101 and the lower substrate 102, together.

The substrate assembly apparatus 200 includes a base 210 movable along the process line 10, a first movable board 220 rotatably mounted over the base 210, and a second movable board 230 rotatably mounted over the first movable board 220.

The base 210 and the first movable board 220 respectively have opposite front portions, and rear portions each connected with one pair of first parallel links 241 each free rotatably mounted with a hinge shaft 244. Also, the first movable board 220 and the second movable board 230 respectively have opposite front portions, and rear portions each connected with one pair of second parallel links 242 each free rotatably mounted with a hinge shaft 244.

Upon application of an external force, the first, and second parallel links 241, and 242 at front and rear portions move at the same time. Over the process line, there is a stopping member 11 mounted thereon for rotating the second movable board 230 and the first movable board 220 in succession as the front portion of the second movable board 230 comes into contact with the stopping member 11 as the substrate assembling apparatus 200 moves along the process line 10.

The stopping member 11 has a 'n' shape substantially, with a space between a front end 11*a* and a rear end 11*b*, with a front length slightly longer than a rear length, such that only the front end 11*a* comes into contact with an upper portion of the second movable board 230.

At opposite sides of the process line 10 under the stopping member 11, there are triangular first, and second cam followers 12, and 13 for guiding rotation of the first, and second movable boards 220, and 230 when the first, and second movable boards 220, and 230 are stopped at the stopping member 11, and rotated downward.

Figure 4:
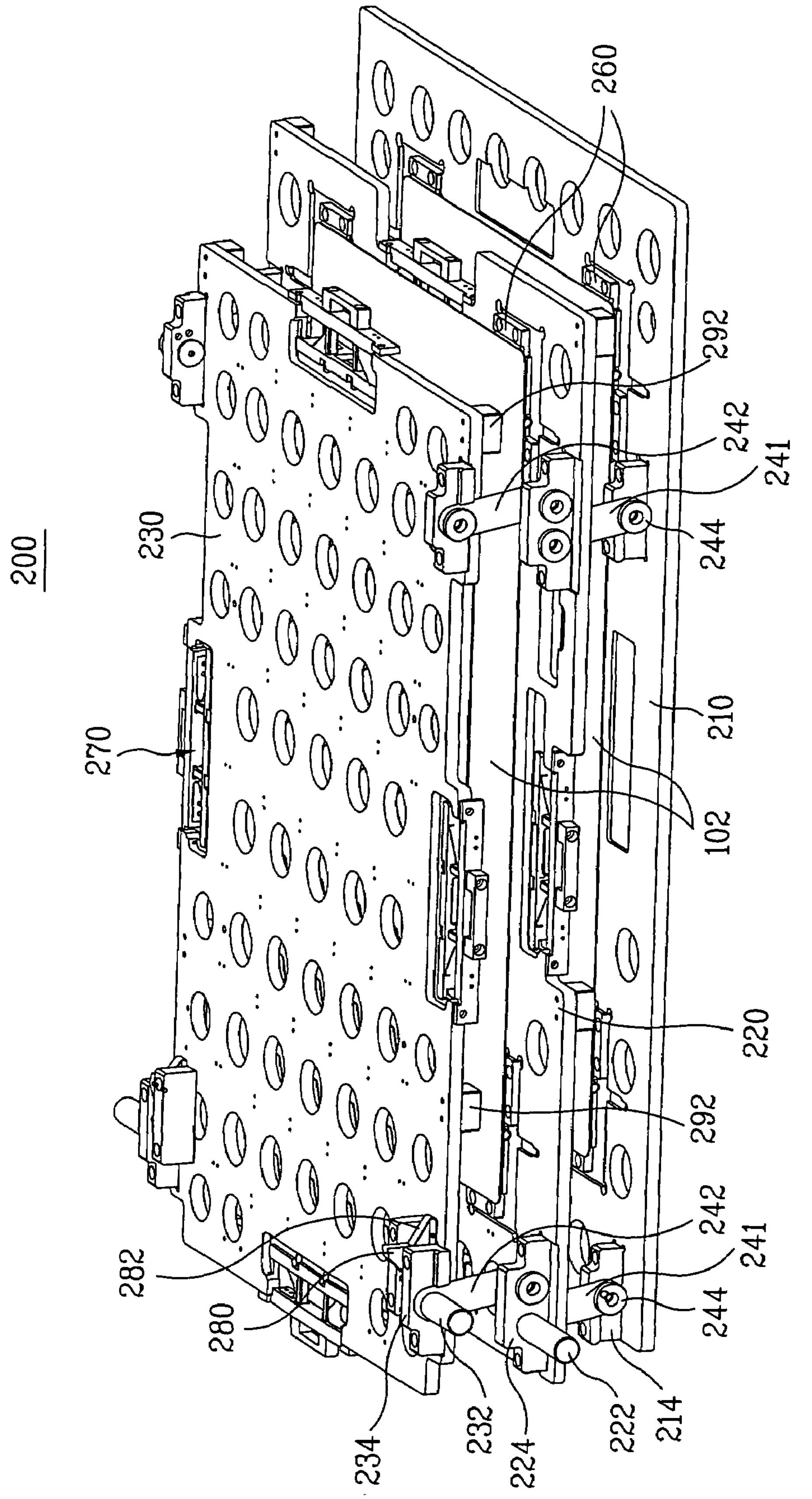
FIG. 4 illustrates a perspective view of the apparatus for assembling substrates in FIG. 3.
Figure 5:
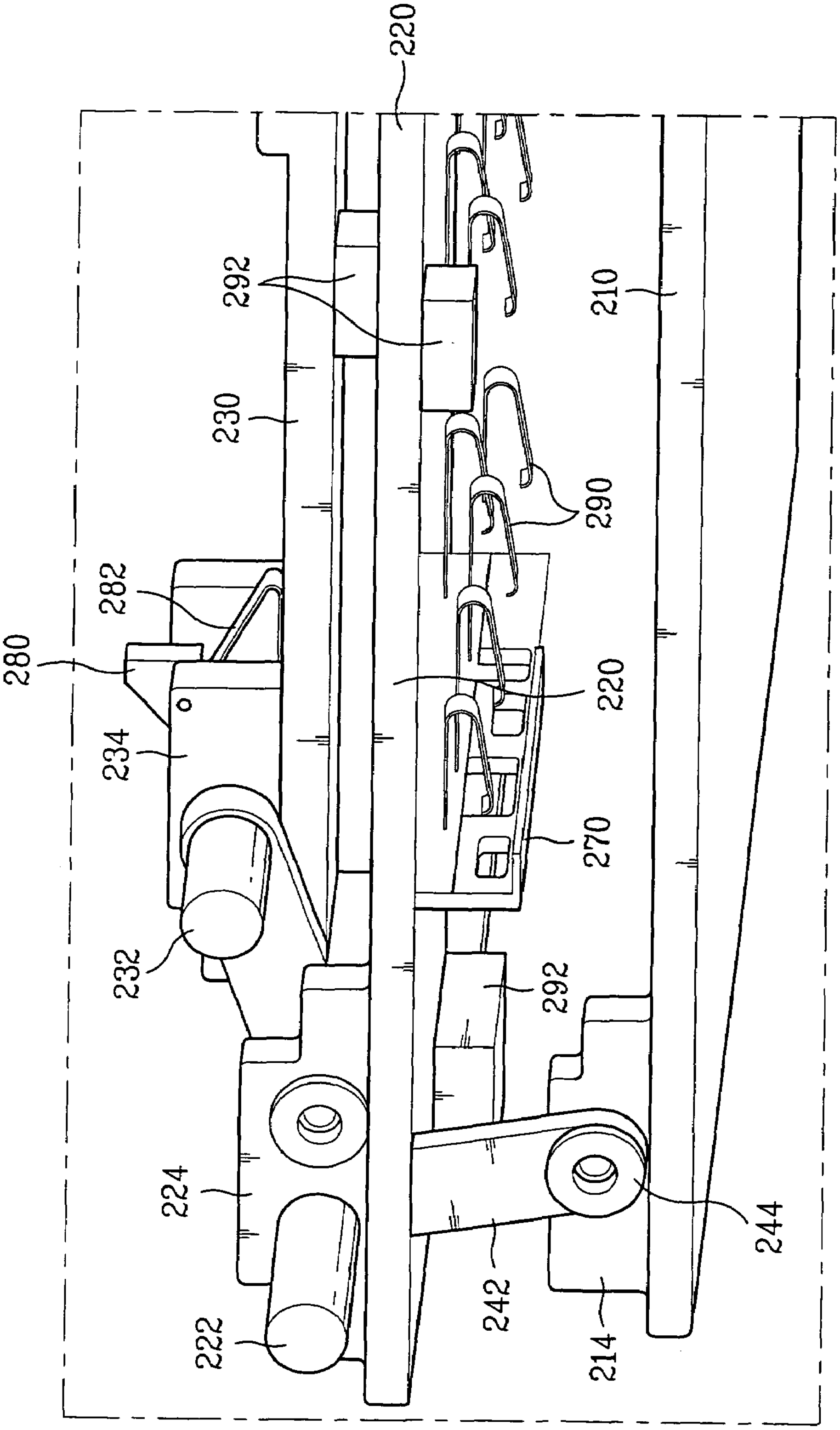
FIG. 5 illustrates a partial perspective view of the apparatus for assembling substrates in FIG. 4 seen from a bottom.
Figure 6:
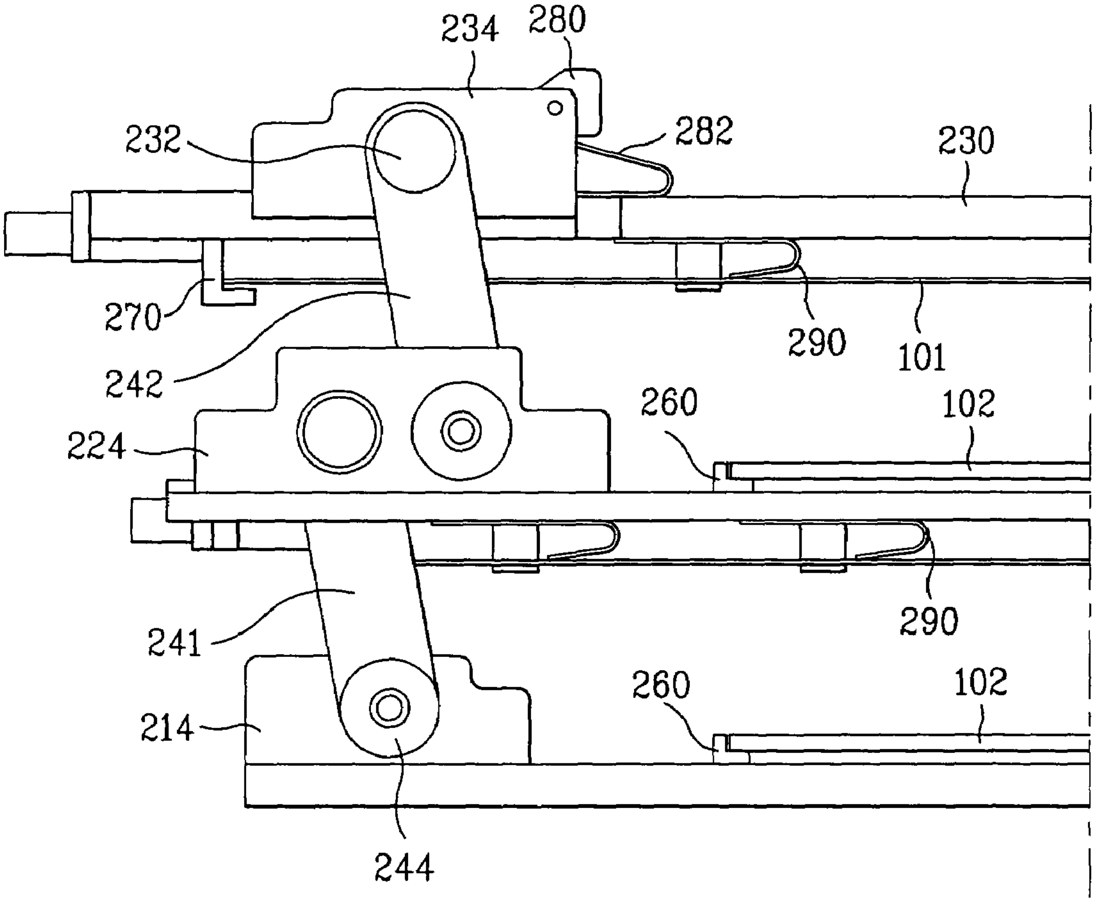
FIG. 6 illustrates a side view of key parts of the apparatus for assembling substrates in FIG. 4.

The substrate assembling apparatus 200 will be described in more detail with reference to FIGS. 4~6. On upper surfaces of the base 210 and the first movable board 220 of the substrate assembling apparatus 200, there are a plurality of seating blocks 260 for seating the lower substrate 102 of the fluorescent lamp 100 (see FIG. 1). Each of the first movable board 220 and the second movable board 230 has clamping members 270 each for holding edges of the upper substrate 101 of the fluorescent lamp 100 at an underside thereof.

At the opposite front portions and rear portions of the base 210 and the first, and second movable boards 220, and 230, there are coupling blocks 214, 224, and 234 for coupling the first, and second parallel links 241, and 242, thereto, respectively.

From the coupling blocks 224 at the opposite front portion of the first movable board 220, there are one pair of guide pins 222 extended outwardly. There are also one pair of guide pins 232 extended outwardly from the coupling blocks 234 at opposite front portions of the second movable board 230. The guide pins 222 at the first movable board 220 are extended longer than the guide pin 232 at the second movable board 230.

The guide pins 222, and 232 move along the first, and second cam followers 12, and 13 when the first, and second movable boards 220, and 230 rotate downwardly, to prevent the first, and second movable board 220, and 230 from moving suddenly.

At the coupling block 234 of the second movable board 230, there is a rotating piece 280 of a right triangle shape substantially mounted rotatable backwardly. There is a plate spring 282 for elastic supporting of the rotating piece 280.

On undersides of the base 210 and the first movable board 220, there are a plurality of plate springs 290 each for applying a downward elastic force to the upper substrate 101 of the fluorescent lamp. The plate spring 290 has a smoothly bent '⊏' form substantially, with a bent portion facing an introduction direction of the upper substrate 101, for preventing the upper substrate 101 from being scratched by the plate springs 290 when the upper substrate 101 is introduced into the substrate assembling apparatus 200.

There are hard stoppers 292 of steel projected downward from opposite front and rear edges of each of the first movable board 220 and the second movable board 230. The hard stopper 292 maintains a gap between the first, and second movable boards 220, and 230 for supplementing a damping action of the plate springs 290, when the first, and second movable boards 220, and 230 move down such that the first, and second movable boards 220, and 230 are brought into contact with the base 210 and the first movable board 220, respectively.

It is preferable that the hard stopper 292 has a height enough to bring the lower substrate 102 into contact with a facing surface, i.e., the base 210 or the first movable board 220, right after the upper substrate 101 and the lower substrate 102 of the fluorescent lamps come into contact.

Figure 7:
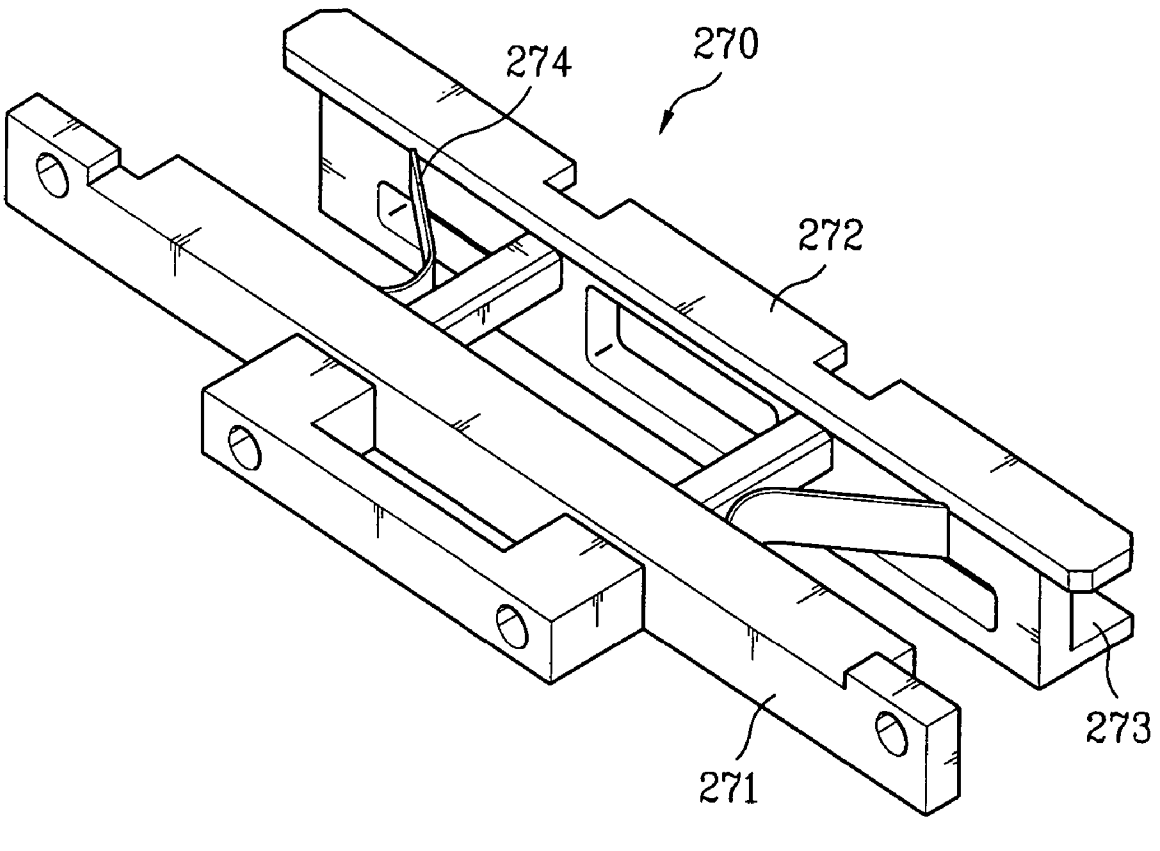
FIG. 7 illustrates a perspective view of the clamping member in the apparatus for assembling substrates in FIG. 4.

Referring to FIG. 7, the clamping member 270 includes a fixed part 271 to be secured to a side of the first, or second movable board 220, or 230, a clamp part 272 mounted to the fixed part to be horizontally movable inwardly, having a holding groove 273 in an inner side for seating an edge of the upper substrate 101 of the fluorescent lamp, and a plate spring 274 between the fixed part 271 and the clamp part 272 for supporting the clamp part 272 with respect to the fixed part 271. The clamp part 272 has an outer portion to be projected outwardly beyond the fixed part 271, so that an external clamping member operating device (not shown) moves the outer portion of the clamp part 272 to move the clamp part 272 in a horizontal direction, for holding and releasing the upper substrate 101 of the fluorescent lamp.

The operation of the substrate assembling apparatus will be described.

At outside of the process line 10 of the furnace, a separate substrate carrier robot (not shown) seats a lower substrate 102 of the fluorescent lamp on a seating block 260 on the base 210 or the first movable board 220 through a space between the base 210 and the first, or second movable board 220, and 230, and makes the upper substrate 101 of the fluorescent lamp clamped at the clamping members 270 of the first movable board 220 and the second movable board 230. In this instance, the upper substrate 101 of the fluorescent lamp is elastically supported on the plate springs 290 under the first movable board 220 or the second movable board 230.

Figure 8:
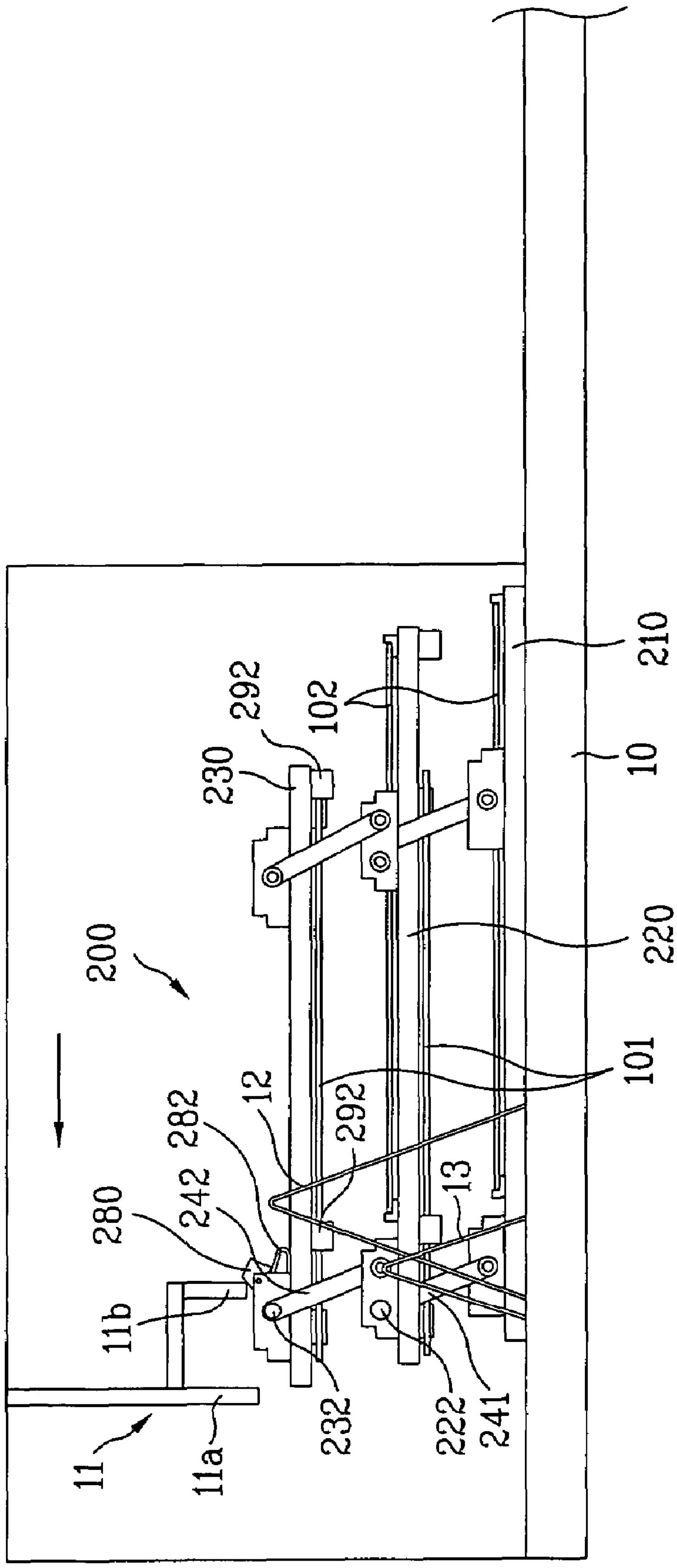
FIGS. 8~13 illustrate side views showing an operation sequence of an apparatus for assembling substrates.

Then, the substrate assembling apparatus 200 is introduced into the process line 10 in the furnace, baked at a predetermined elevated temperature, and is kept proceeding along a process line 10 for assembly. As shown in FIG. 8, during the substrate assembling apparatus 200 passes the stopping member 11, the substrate assembling apparatus 200 proceeding thus comes into contact with the rear end 11*b* of the stopping member 11 such that the rotating piece 280 of the substrate assembling apparatus 200 rotates and returns to an original position elastically at first, at a time the coupling block 234 of the second movable board 230 passes the rear end 11*b* of the stopping member 11 and right before the coupling block 234 of the second movable board 230 meets with the front end 11*a*.

Figure 9:
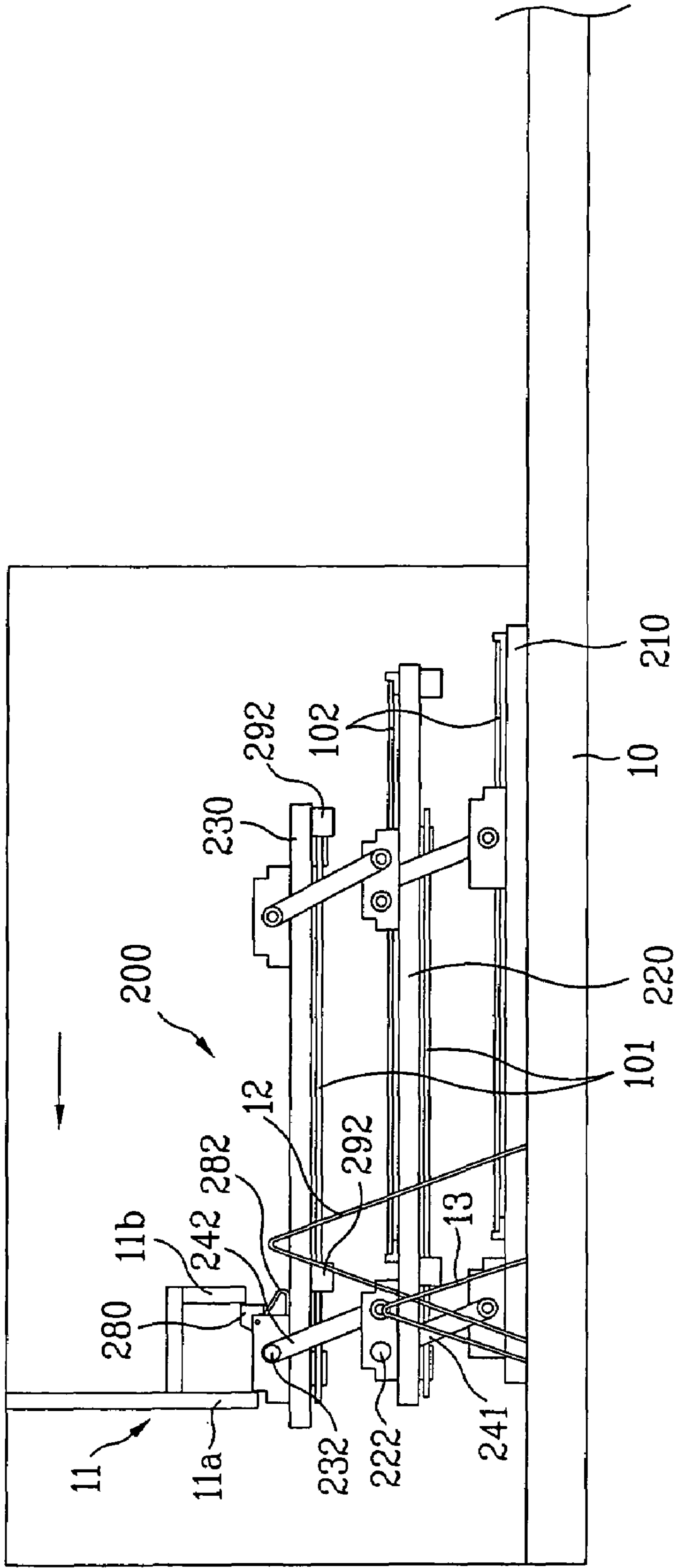

Then, referring to FIG. 9, an upper portion of the coupling block 234 of the second movable board 230 comes into contact with the front end 11*a* of the stopping member 11, such that the second movable board 230 moves backward by the second parallel links 242, so as to rotate downwardly. In this instance, since a rear end of the rotating piece 280 comes into contact with the rear end 11*b* of the stopping member 11, and moves downward, sudden backward downward rotation of the second movable board 230 is prevented, primarily.

Figure 10:
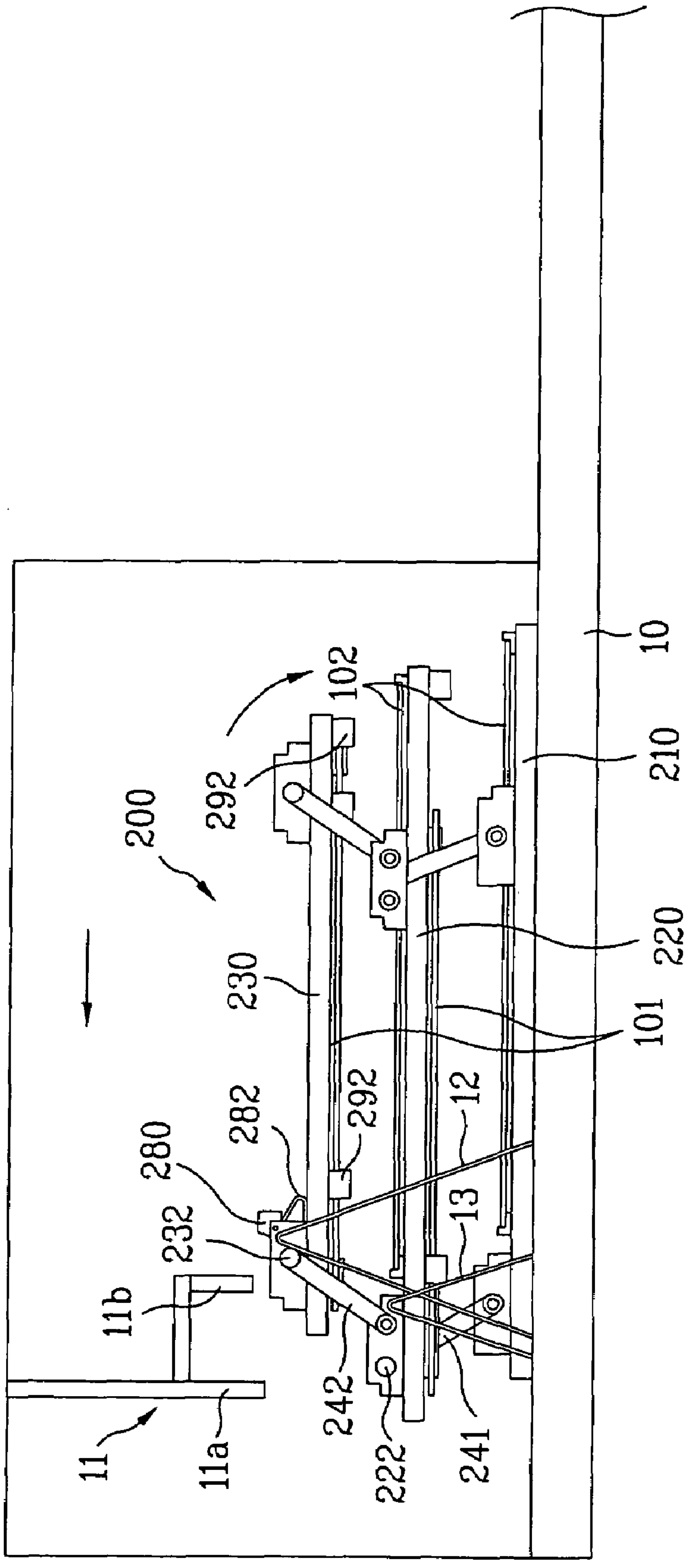

Then, referring to FIG. 10, the guide pin 232 of the second movable board 230 comes into contact with a front slope of the first cam follower 12 on the process line 10, and moves along the front slope, such that the second movable board 230 rotates slowly.

Figure 11:
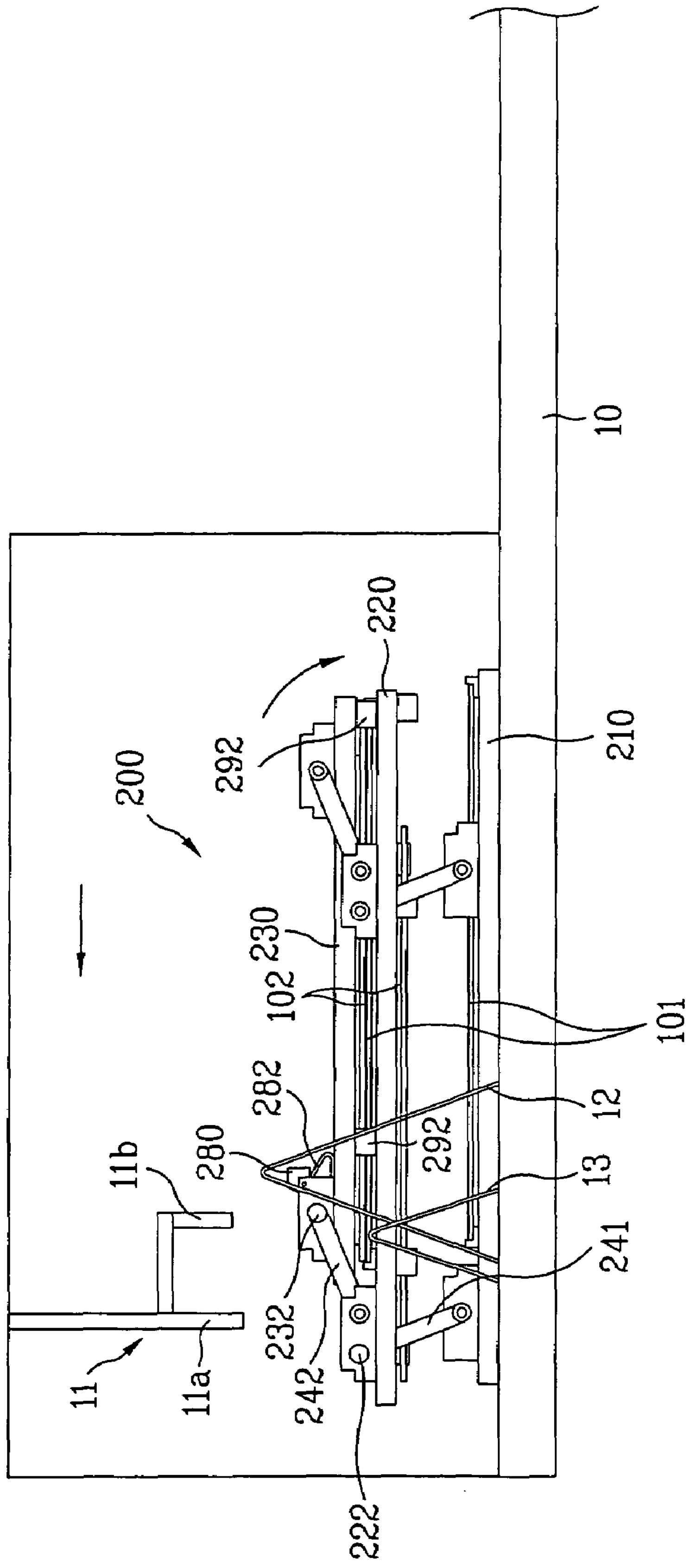

Referring to FIG. 11, when the second movable board 230 rotates completely with respect to the first movable board 220, the upper substrate 101 and the lower substrate 102 of the fluorescent lamp come into contact completely, and, then, the hard stopper 292 of the second movable board 230 comes into contact with the upper surface of the first movable board 220, instantly. In this instance, the plate springs 290 on the second movable board 230 dampens, to absorb impact caused by contact of the upper substrate 101 and the lower substrate 102 of the fluorescent lamp.

Figure 12:
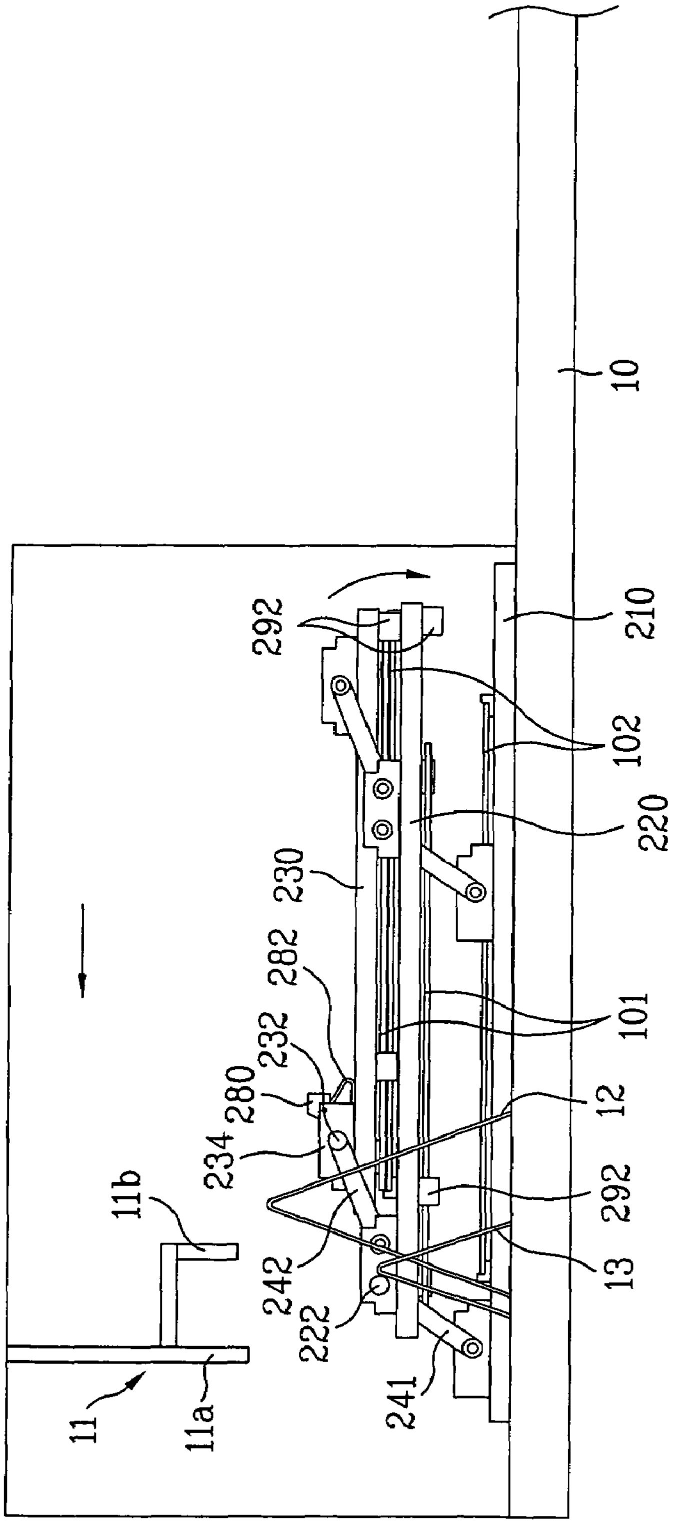

Referring to FIG. 12, after second movable board 230 comes into contact with the first movable board completely, the first movable board 220 rotates downward in a rear direction as the first parallel link 241 of the first movable board 220 rotates by rotational inertia. In this instance, as the first movable board 220 rotates downwardly in a rear direction, the guide pin 222 of the first movable board 220 comes into contact with, and moves along, a front slope of the second cam follower 13 on the process line 10, such that the first movable board 220 rotates slowly.

Figure 13:
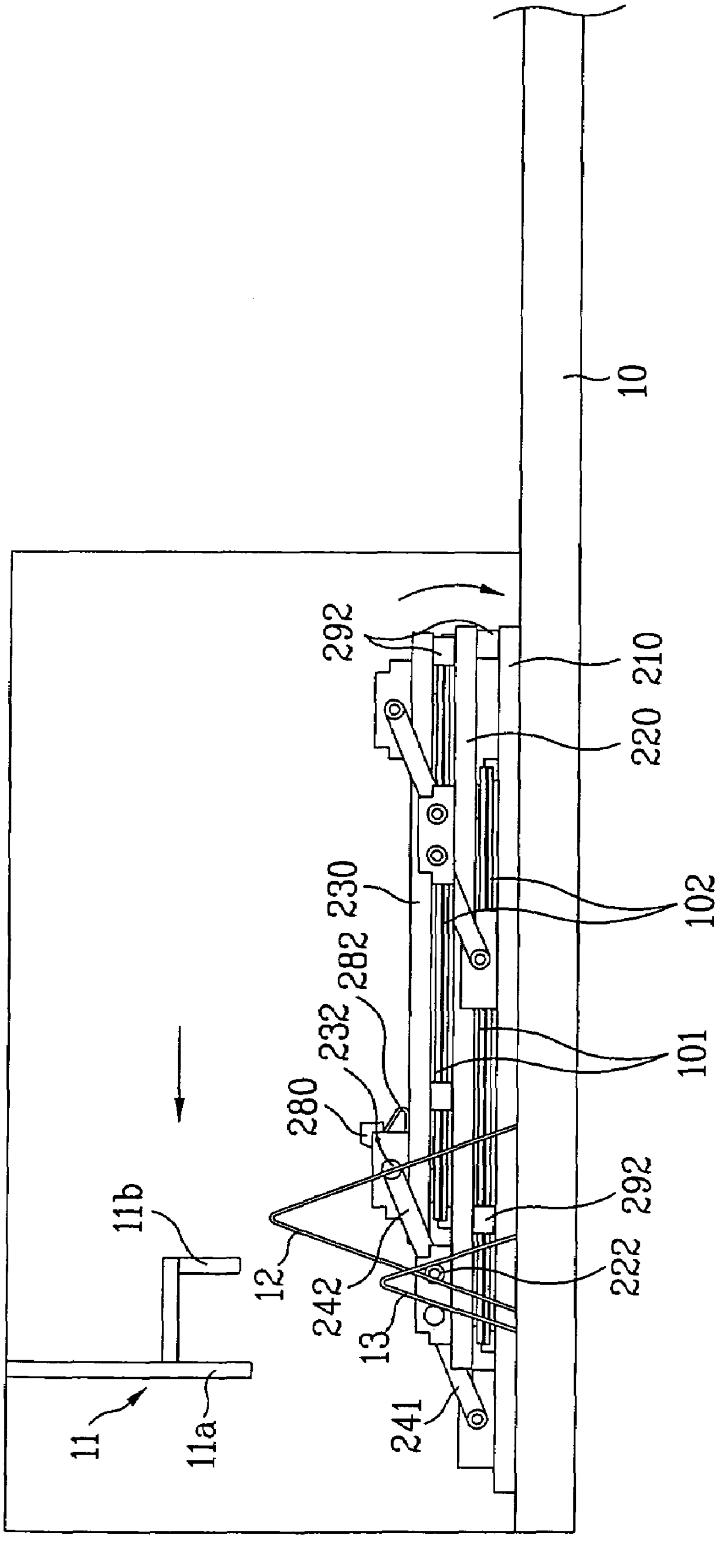

Referring to FIG. 13, when the first movable board 220 rotates completely with respect to the base 210, as described before, the upper substrate 101 and the lower substrate 102 of the fluorescent lamp come into contact elastically, and then, the hard stopper 292 of the first movable board 220 comes into contact with the upper surface of the base 210 soon, leaving a gap between the first movable board 220 and the base 210.

Thus, when the upper substrate 101 and the lower substrate 102 of the fluorescent lamp come into contact fully by rotation of the first, and second movable boards 220, and 230, the substrate assembling apparatus 200 keeps moving along the process line 10 of the furnace, to bake sealfrit of the upper substrate 101 and the lower substrate 102.

Thus, the present invention minimizes damage to the fluorescent lamp at the time the first, and second movable boards 220, and 230 rotate to bring the upper substrate 101 and the lower substrate 102 of the fluorescent lamp into contact, by preventing the first and second movable boards 220, and 230 from rotating suddenly by means of the rotating piece 280 and the guide pins 222, and 232, and by the action of the plate springs 290 and the hard stopper 292.

Moreover, since the upper substrate 101 and the lower substrate 102 of the fluorescent lamp 100 are moved at the same time mounted on the substrate assembling apparatus 200, the assembling process can be performed in succession to the baking process directly without drawing out the substrate from the furnace after the baking, and putting the substrate into the furnace for the assembly process, again.

In the meantime, even though the foregoing description of the embodiment of the present invention is given with reference to a two tiered substrate assembling apparatus which enables assembly of two fluorescent lamps at a time, the substrate assembling apparatus may have one tier, or three tier or more than three tiers, such that only one fluorescent lamp can be assembled, or three or more than three fluorescent lamps can be assembled at a time.

Though plate springs 290 are used for elastic supporting of the upper substrate 101 of the fluorescent lamp, different from this, a plurality of coil springs may be mounted, with a plate under the coil springs with a size the same with the upper substrate 101 of the fluorescent lamp, for elastic supporting of the upper substrate 101 of the fluorescent lamp.

Of course, besides the upper substrate of the fluorescent lamp, for elastic supporting of the lower substrate of the fluorescent lamp, identical or similar plate springs or other elastic bodies may be mounted on an upper surface of the base 210 and the first movable board 220.

Moreover, even though the foregoing embodiment is described with reference to a case the lower substrates 102 of the fluorescent lamps are respectively placed on the upper surface of the base 210 and the first movable board 220, and the upper substrates 101 of the fluorescent lamps are placed on under sides of the first, and second movable boards 220, and 230, of course, the upper, and lower substrates 101, and 102 may be mounted, oppositely, as the case demands.

As has been described, the substrate assembling apparatus of the planar fluorescent lamp of the present invention has the following advantages.

First, the simultaneous holding and carrying of the upper substrate and the lower substrate of the fluorescent lamp, and successive performance of the baking and assembling by using the substrate assembling apparatus at the time of baking and assembling of the fluorescent lamp in a furnace minimizes feeding, and drawing out of the substrates into/from the furnace, to make working speed high, productivity can be improved, significantly.

Second, the simultaneous assembly of a plurality of upper substrates and lower substrates without using separate driving means within a furnace at an elevated temperature, to permit fabrication of a plurality of fluorescent lamps at a time, reduces a fabrication time period, significantly.

Third, the minimized impact at the time of putting the upper substrate upon the lower substrate in the assembly process reduces damage to the upper substrate and the lower substrate, to save a production cost.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for assembling substrates of a planar fluorescent lamp, comprising:

- a base that is movable along a process line, the base having an upper surface for placing a first substrate of the fluorescent lamp;
- at least one movable board over the base, the movable board being mounted such that it is rotatable between a first position and a second position;
- at least one pair of parallel links each having one end rotatably coupled to the base and the other end rotatably coupled to the movable board such that the movable board is rotatable from the first position to the second position;
- a plurality of clamping members mounted on the movable board for holding a second substrate of the fluorescent lamp at a position under the movable board;
- a stopping member mounted in the process line over a direction of movement of the base, for coming into contact with the movable board to cause rotation of the movable board; and
- a damping member for making a damping action at a time the first, and second substrates of the fluorescent lamp come into contact with each other as the movable board rotates downwardly.

2. The apparatus as claimed in claim 1, wherein the damping member includes an elastic body mounted on an underside of the movable board for applying downward elastic force to the second substrate held under the movable board.

3. The apparatus as claimed in claim 2, wherein the damping member further includes hard stoppers that are mounted such that the stoppers to maintain a predetermined gap between the movable board and the base when the first substrate is put upon the second substrate following rotation of the movable board.

4. The apparatus as claimed in claim 2, wherein the elastic body is plate springs.

5. The apparatus as claimed in claim 2, wherein the damping member further includes lower elastic bodies on an upper surface of the base for applying upward elastic force to the first substrate seated on the base.

6. The apparatus as claimed in claim 5, wherein the lower elastic body is plate springs.

7. The apparatus as claimed in claim 3, wherein the hard stoppers project downward from an edge of the movable board by a predetermined height.

8. The apparatus as claimed in claim 1, further comprising a second stopping member spaced a distance away from the stopping member in a tear direction, and a supplementary damping member for coming into contact with, and being guided by the second stopping member when the movable board rotates downwardly, to drop a rotation speed of the movable board.

9. The apparatus as claimed in claim 8, wherein the supplementary damping member includes;

- at least one rotating piece rotatably mounted on top of the movable board such that it comes into contact with, and is rotated by the second stopping member, wherein a rear of the rotating piece is brought into contact with, and guided by the second stopping member, and an elastic body for supporting the rotating piece, elastically.

10. The apparatus as claimed in claim 1, further comprising: guide pins extended outwardly from the movable board; and at least one cam follower mounted under the process line, for coming into contact with the guide pins, and guiding the guide pins when the movable board rotates downwardly.

11. The apparatus as claimed in claim 1, wherein the clamping member includes; a fixed part secured to the movable board, a clamp part mounted to the fixed part to be movable horizontally, the clamp part having a holding groove in an inner side for seating an edge of the second substrate, and an elastic body between the fixed part and the clamp part for supporting the clamp part with respect to the fixed part.

12. The apparatus as claimed in claim 1, wherein the at least one movable board includes a plurality of movable boards arranged in up/down directions to form a multiple tiered structure, each of the movable boards being coupled with parallel links so as to be movable relative to one another, for assembling a plurality of substrates at a time.

13. The apparatus as claimed in claim 12, wherein the damping member further includes hard stoppers that are mounted such that the stoppers maintain a predetermined gap between the movable board and the base when the first substrate is put upon the second substrate following rotation of the movable board.

14. The apparatus as claimed in claim 12, wherein the damping member further includes hard stoppers that are mounted such that they maintain predetermined gaps between the movable board and the base, and between the movable boards respectively when the first substrate is put upon the second substrate following rotation of the movable boards.

15. The apparatus as claimed in claim 13, wherein the damping member includes elastic bodies mounted on undersides of the plurality of movable boards for applying downward elastic forces to the second substrates held under the movable boards, and wherein the elastic bodies are plate springs.

16. The apparatus as claimed in claim 13, wherein the damping member further includes lower elastic bodies on upper surfaces of the base and the movable board for applying upward elastic force to the first substrate seated on the base or the movable board.

17. The apparatus as claimed in claim 14, wherein the hard stoppers project downward from edges of the movable boards by a predetermined height.

18. The apparatus as claimed in claim 1, further comprising a second stopping member spaced a distance away from the stopping member in a rear direction, and a supplementary damping member for coming into contact with, and being guided by the second stopping member when an uppermost one of the movable boards rotates downwardly, to drop a rotation speed of the movable board.

19. The apparatus as claimed in claim 18, wherein the supplementary damping member includes:

at least one rotating piece rotatably mounted on top of the uppermost one of the movable boards such that it comes into contact with, and is rotated by the second stopping member, such that a rear of the rotating piece is brought into contact with, and guided by the second stopping member; and an elastic body for supporting the rotating piece, elastically.

20. The apparatus as claimed in claim 12, further comprising: guide pins extended outwardly from each of the movable boards; and a plurality of cam followers mounted under the process line, for coming into contact with the guide pins, and guiding the guide pins when the respective movable boards rotate, downwardly.

21. The apparatus as claimed in claim 12, wherein the clamping member includes; a fixed part secured to the movable board, a clamp part mounted to the fixed part to be movable horizontally, the clamp part having a holding groove in an inner side for seating an edge of the second substrate, and an elastic body between the fixed part and the clamp part for supporting the clamp part with respect to the fixed part.

22. An apparatus for assembling substrates of a planar fluorescent lamp comprising:

a base that is movable along a process line, the base having an upper surface for placing a first substrate of the fluorescent lamp;

a plurality of movable boards arranged to form a multiple tiered structure over the base, each of the movable boards being mounted such that they are rotatable between a first position and a second position;

at least one pair of first parallel links each having opposite ends rotatably coupled to the base and the lowest one of the movable boards, respectively such that the lowest one of the movable board is rotatable from the first position to the second position;

at least one pair of second parallel links each having opposite ends rotatably coupled to the movable boards adjacent to each others respectively, so that an overlying movable board rotates with respect to an underlying movable board;

a plurality of clamping members mounted on each of the movable boards for holding a second substrate of the fluorescent lamp at a position under the movable board;

a stopping member mounted in the process line over a direction of movement of the base, for coming into contact with the uppermost one of the movable boards to cause rotation of the movable board; and a damping member for making a damping action when the first and second substrates of the fluorescent lamps come into contact with each other as the movable board rotates downwardly.

23. The apparatus as claimed in claim 22, further comprising hard stoppers of steel mounted such that they maintain a predetermined gap between the movable boards, and between the movable board and the base when the first substrate is put upon the second substrate following rotation of the movable boards.

24. The apparatus as claimed in claim 22, further comprising a second stopping member spaced a distance away from the stopping member in a rear direction, and a supplementary damping member for coming into contact with, and being guided by the second stopping member when an uppermost one of the movable boards rotates downwardly, to drop a rotation speed of the movable board.

25. The apparatus as claimed in claim 24, wherein the supplementary damping member includes:

at least one rotating piece rotatably mounted on top of the uppermost one of the movable boards such that it comes into contact with, and is rotated by the second stopping member, such that a rear of the rotating piece is brought into contact with, and guided by the second stopping member: and an elastic body for supporting the rotating piece, elastically.

* * * * *